United States Patent
Winger et al.

(10) Patent No.: US 6,626,417 B2
(45) Date of Patent: Sep. 30, 2003

(54) MICROFLUIDIC VALVE AND MICROACTUATOR FOR A MICROVALVE

(75) Inventors: Theodore M. Winger, Oceanside, CA (US); John D. Evans, Marina del Rey, CA (US); Noel G. Harvey, Efland, NC (US)

(73) Assignees: Becton, Dickinson and Company, Franklin Lakes, NJ (US); Nanogen, Inc., San Diego, CA (US)

(*) Notice: Subject to any disclaimer, the term of this patent is extended or adjusted under 35 U.S.C. 154(b) by 0 days.

(21) Appl. No.: 09/790,530

(22) Filed: Feb. 23, 2001

(65) Prior Publication Data

US 2002/0117643 A1 Aug. 29, 2002

(51) Int. Cl.[7] ............................................. F16K 31/02
(52) U.S. Cl. .............................. 251/129.06; 251/129.01
(58) Field of Search ........................ 251/129.06, 129.01

(56) References Cited

U.S. PATENT DOCUMENTS

| | | | |
|---|---|---|---|
| 4,581,624 A | * 4/1986 | O'Connor | 137/831 |
| 4,966,646 A | 10/1990 | Zdeblick | 156/633 |
| 5,058,856 A | * 10/1991 | Gordon et al. | 251/11 |
| 5,271,724 A | * 12/1993 | van Lintel | 137/554 |
| 5,309,943 A | 5/1994 | Stevenson et al. | 137/625.5 |
| 5,338,416 A | 8/1994 | Mlcak et al. | 204/129.3 |
| 5,344,117 A | 9/1994 | Trah et al. | 251/11 |
| 5,378,583 A | 1/1995 | Guckel et al. | 430/325 |
| 5,429,713 A | 7/1995 | Stevenson et al. | 216/2 |
| 5,681,024 A | 10/1997 | Lisec et al. | 251/11 |
| 5,780,748 A | 7/1998 | Barth | 73/861.47 |
| 5,785,295 A | * 7/1998 | Tsai | 251/11 |
| 5,788,468 A | 8/1998 | Dewa et al. | 417/415 |
| 5,796,152 A | 8/1998 | Carr et al. | 257/415 |
| 5,965,410 A | 10/1999 | Chow et al. | 435/91.2 |
| 5,971,355 A | 10/1999 | Biegelsen et al. | 251/129.06 |
| 5,993,414 A | 11/1999 | Haller | 604/93 |
| 6,051,380 A | 4/2000 | Sosnowski et al. | 435/6 |
| 6,056,269 A | * 5/2000 | Johnson et al. | 251/331 |
| 6,071,394 A | 6/2000 | Cheng et al. | 204/547 |
| 6,072,509 A | * 6/2000 | Wen et al. | 346/140.1 |
| 6,109,852 A | * 8/2000 | Shahinpoor et al. | 244/213 |
| 6,115,223 A | * 9/2000 | Berg et al. | 360/294.4 |
| 6,123,316 A | * 9/2000 | Biegelsen et al. | 251/129.01 |
| 6,149,123 A | * 11/2000 | Harris et al. | 251/11 |

* cited by examiner

Primary Examiner—Kevin Shaver
Assistant Examiner—D A Bonderer
(74) Attorney, Agent, or Firm—Roylance, Abrams, Berdo & Goodman, L.L.P.

(57) ABSTRACT

A microactuator device includes a base with at least one electrode pad and a permeation membrane. Permeation membrane is typically a water-permeable membrane that is able to deform by applying an electric charge to the electrode pad. The actuator device can be incorporated into valve assembly to open and close the valve. The valve assembly can have a reciprocating valve member operated by the deforming of the water-permeable member. Alternatively, the valve assembly can have an opening positioned to cooperate with the water-permeable membrane so that the deformation of the membrane closes the opening.

38 Claims, 6 Drawing Sheets

MICROFLUIDIC VALVE AND MICROACTUATOR FOR A MICROVALVE

FIELD OF THE INVENTION

The present invention is directed to a micro device and to an actuator device for operating a micro device. More particularly, the invention is directed to a valve structure for use in a microfluidic device and to a micro device for actuating a microvalve.

BACKGROUND OF THE INVENTION

Various micro devices are known in the art for performing different tasks. One application that has received interest in recent years is in the field of fluid control devices and particularly microvalves. The microvalves have been shown to be useful in many industrial applications including the field of drug delivery, fuel delivery systems for internal combustion engines, as well as ink jet printers. These devices have been made by a number of different processes.

The many techniques that are commonly used in the fabrication of electronic devices and integrated circuit chips are suitable for micromachining of micromechanical devices. These micro devices are typically referred to as micro-electrical mechanical systems (MEMS). The devices are extremely small and can be made from numerous kinds of materials. A common material is silicon in the form of silicon wafers used in the integrated circuit industry. Other materials that can be used include glass and ceramics.

An example of a microvalve is disclosed in U.S. Pat. No. 6,056,269 to Johnson et al. The microvalve disclosed therein includes a silicon diaphragm with a valve seat and a flow channel. The diaphragm is positioned so it is able close against the valve seat when the diaphragm is deflected. A separate actuating force is applied to the diaphragm to open and close the valve. The actuating device can be a pressurized fluid or a solenoid mechanism to apply a force to one side of the diaphragm.

Solenoid actuation of a valve in a gas chromatography assembly is known as disclosed in U.S. Pat. No. 4,582,624 to Terry et al. These devices are not always effective in actuating the valve structure since the actuation force can be difficult to control and provide sufficient force. The solenoid actuated devices are also expensive to produce and portions of the device can not be manufactured efficiently.

Another microactuator device is disclosed in U.S. Pat. No. 5,344,117 to Trah et al. The actuator is made from a silicon body having a bending element that is able to bend within a recess formed in the bottom of the silicon body. A force element is coupled to the top surface of the bending element to cause the deflection of the bending element. The force element is disclosed as operating on a thermal expansion and contraction.

Another manner of actuating a microvalve device is by the use of electrostatic force to deflect a flexible diaphragm. The diaphragm is used to seal the outlet of the valve by contacting the valve seat. It has been found that the electrostatic force cannot be produced in a reliable and consistent manner. An example of this type of device is disclosed in U.S. Pat. No. 452,624.

Micro pumps are also known for various uses and particularly for a driving an inkjet printer. These pumps typically have a piezoelectric crystal fitted to a membrane that is able to move the membrane and cause the pumping action. A disadvantage of this type of device is that the device is affected by temperature since the membranes can deform with temperature changes.

Another type of micro device is actuated by an electrically driven actuator. One example is a device that has a plurality of legs made from a bimetallic material. The bimetallic legs are heated to cause stresses and deflection in the legs due to the unequal expansion coefficient. The deflection of the legs actuates the device. This is a typical manner of actuating a microvalve since the actuator is able provide control to increase or decrease the fluid flow through an orifice.

Other microvalve structures and methods of controlling and actuating the valve are disclosed in U.S. Pat. No. 5,058,856 to Gordon et al., U.S. Pat. No. 5,780,780 to Barth, U.S. Pat. No. 5,681,024 to Lisec et al. and U.S. Pat. No. 5,429,713 to Stevenson et al.

The prior devices for controlling micro devices and particularly microvalves have been successful for many purposes but have met with limited success for others. Accordingly there is a need in the industry for an improved actuating devices for various micro devices.

SUMMARY OF THE INVENTION

The present invention is directed to a micro device and to an actuator device for operating a micro device. More particularly, the invention is directed to a microfluidic device such as a microvalve and to an actuator for operating a micro device.

Accordingly, a primary object of the invention is to provide a microvalve that can be used for various medical applications such as in the field of drug delivery.

Another object of the invention is to provide a microvalve that can be manufactured by micromachining techniques.

A further object of the invention is to provide a microactuator that can be manufactured by microelectromechanical processes.

Still another object of the invention is to provide a microvalve having a minimal number of moving components and is economical to produce.

Another object of the invention is to provide a microvalve having a membrane made from a polymeric material that is deformed by applying an electric current to the membrane so that the membrane contacts a valve seat and closes the valve.

A further object of the invention is to provide a microvalve having an electrode pad with a permeation membrane where the thickness of the permeation membrane is expandable by applying an electric current to the electrode.

Another object of the invention is to provide a microvalve having an electrode pad with a water permeable membrane attached thereto and spaced from a valve seat where the membrane deforms in a first direction when a positive charge is applied to the electrode pad and deforms in a second direction when a negative charge is applied.

A further object of the invention is to provide an actuator for a micro device where the actuator includes an electrode and a permeation layer that is deformed when an electric current is applied to the electrode.

Still another object of the invention is to provide an actuator of a micro device having an electrode with a permeation membrane thereon where the membrane expands in a direction perpendicular to the electrode when an electric current is applied.

Another object of the invention is to provide an actuator for a micro device where the actuator impinges on a micro device and is actuated by selectively applying either a positive charge or a negative charge to the actuator.

The various objects and advantages of the invention are basically attained by providing an actuator for a micro device comprising an electrode pad having a water permeable membrane on the electrode pad, and an actuator member contacting the water permeable membrane. The water permeable membrane is selected to expand and contact when an electric current is applied to the electrode pad in order to move the actuator member.

The objects of the invention are further attained by providing a microvalve comprising a base substrate having at least one electrode pad with a permeation membrane on the electrode pad. The permeable membrane is deformable when an electric current is applied to the electrode. A top wall is spaced from the water permeable membrane to define a fluid path between the top wall and the water permeable membrane. The permeation membrane is deformable when an electric current is applied to substantially close the fluid path.

The objects of the invention are further attained by providing a method of actuating a valve assembly of a microfluidic device, where the method comprises providing a microfluidic valve assembly having a base substrate with at least one electrode pad, and a deformable water permeable membrane on the electrode pad. A top wall is spaced from the water permeable membrane to form a fluid path between the water permeable membrane and the top wall. An electric current is applied to the electrode pad for sufficient time to expand the water permeable membrane to substantially close the fluid path.

The objects, advantages and other salient features of the invention will become apparent to one skilled in the art in view of the following detailed description of the invention in conjunction with the annexed drawings, which form a part of this original disclosure.

BRIEF DESCRIPTION OF THE DRAWINGS

The following is a brief description of the drawings that form a part of this original disclosure, in which.

DETAILED DESCRIPTION OF THE INVENTION

The present invention is directed to a micro device and to an actuating device for operating a micro device. Moreover, the invention is directed to a microelectromechanical device and to a method of actuating a microelectromechanical device.

The microelectromechanical actuator device in a first embodiment of the invention as shown in the drawings is a valve body 10 comprising an actuator 12 and a valve housing 14. Valve 10 can be used for a number of different types of micro devices but is particularly suitable for microfluidic devices for testing and analysis of biological samples. In the illustrated embodiments of the invention, actuator 12 is used in microvalves although it will be understood that the invention is not limited to microvalves. One skilled in the art will appreciate that the actuator can be used for a number of different applications where movement of a micro device is required.

Referring to FIGS. 1–5 showing a first embodiment of the invention includes actuator 12 having a base substrate 16 and a permeation membrane 18. Base 16 is coupled to housing 14 to define valve body 10.

Base 16 as shown is a substantially planar member having a top face 20 and a bottom face 22. In the embodiment shown in FIG. 1, top face 20 is a substantially flat surface although in further embodiments the top face 20 can be curved or contoured to accommodate the particular design requirements of the valve. An electrode 24 and a counter electrode 26 are coupled to top face 20 of base 16. In preferred embodiments of the invention electrodes 24 and 26 are spaced apart a sufficient distance to provide an electric charge to selected areas of permeation membrane 18 as discussed hereinafter in greater detail. Electrodes 24 and 26 are connected to a suitable power source by leads 25 and 27, respectively. Alternatively, electrodes 24 and 26 can be connected to a power source by wires or other suitable electrical circuits as known in the art.

Figure 1:
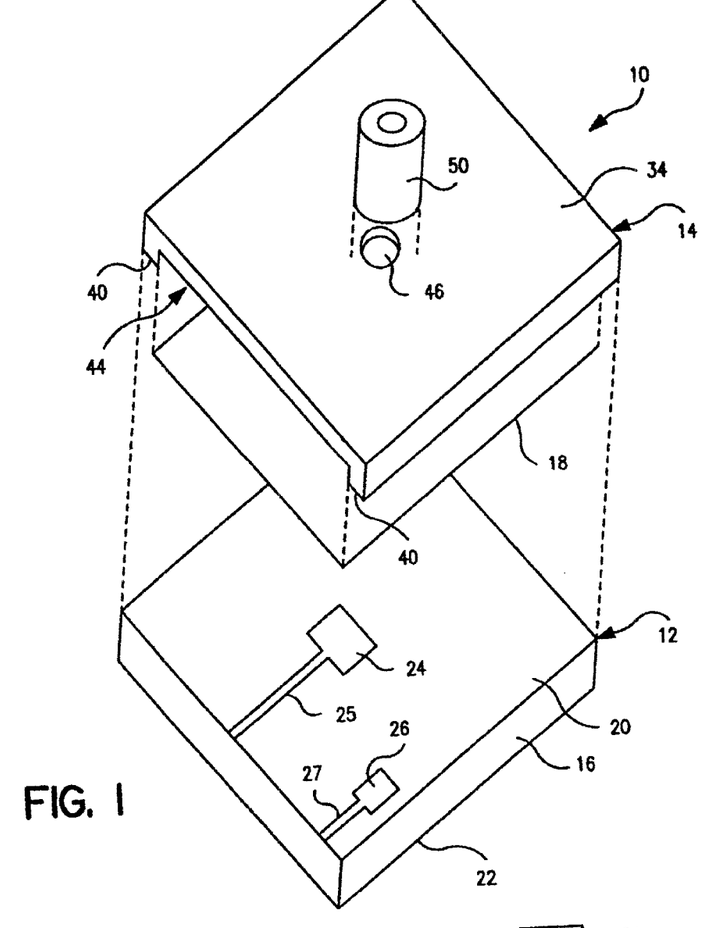
FIG. 1 is an exploded perspective view of the microvalve device in one embodiment of the invention showing the electrode pad and the valve housing.

Electrodes 24 and 26 are formed from an electrically conductive metal that is bonded to base 16 in a manner to maintain the electrodes in a secure position throughout use of actuator 12. In preferred embodiments the electrodes 24 and 26 are produced and fixed to base 16 by known methods for producing electrical components and electrical circuits. The electrodes are typically produced by photolithography methods commonly used for manufacturing integrated circuits.

In the embodiment of FIGS. 1–5, a single electrode 24 and a single counter electrode 26 are provided on base 16. It will be appreciated that several electrodes and counter electrodes can be used depending on the particular requirements of the actuator 12. An insulating layer 29 or passivation layer is applied over base 16 and a portion of electrode 24 in a manner to form an exposed area on electrode 24 and counter electrode 26. Permeation membrane 18 is bonded to base 16 and electrodes 24 and 26 in a known manner. In preferred embodiments of the invention, permeation membrane 18 is a water permeable membrane that is laminated or formed directly on base 16 and electrodes 24 and 26. In the embodiment illustrated the permeation membrane 18 has a dimension to overlie a substantial portion of base 12. Preferably permeation membrane 18 has a dimension to completely cover the exposed areas of electrode 24 and counter electrode 26.

Figure 2:
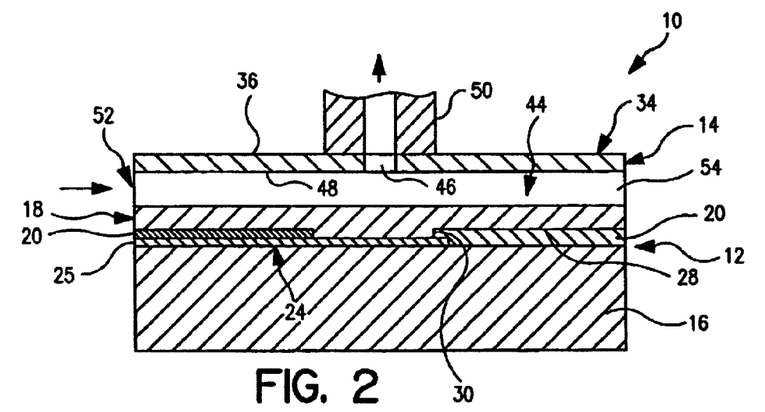
FIG. 2 is a cross-sectional side view of the microvalve device of FIG. 1 showing the valve structure in the relaxed and open position.

As shown in FIG. 2, permeation membrane 18 has a first major portion 28 and a second minor portion 30 that is integrally formed with major portion 28. Minor portion 30 of permeation membrane 18 overlying the exposed portion of electrode 24 and forms a thickened area in a center portion of membrane 18 having a thickness that is greater than the thickness of major portion 28. In a preferred embodiment first major portion 28 is coextensive with base 12 and electrodes 24 and 26. Second minor portion 30 of permeation membrane 18 is dimensioned to cover electrode 24. In preferred embodiments of the invention, electrically insulating layer 29 is included to surround electrode 24 and to isolate electrode 24 from counter electrode 26. In further embodiments, the permeation membrane 18 can be of a uniform thickness across the base 12.

Valve housing 14 includes a top wall 34 as shown in FIGS. 1–5 and has an outer surface 36 with a substantially planar configuration. Preferably, valve housing 14 and top wall 34 have a dimension complementing the outer dimensions of base 12. Top wall 34 includes legs 36 extending downwardly from opposite outer edges 38 thereof. Legs 36 have outer ends 40 that are coupled to the outer edges 38 of base 12 and have a length to space top wall 34 from base 12. Legs 36 are dimensioned to form a fluid flow channel 44 between top wall 34 and permeation membrane 18. The dimension of flow channel 44 is determined by the extent of deformation of membrane 18. Typically, top wall 34 is spaced from membrane 18 a distance of about 3–6 microns when membrane is in a relaxed state. An opening 46 is provided in top wall 34 extending between outer surface 36 and an inner surface 48. Opening 46 is preferably oriented directly above electrode 24. In the embodiment illustrated, top wall 34 includes an annular column 50 coupled to top wall 34 and surrounding opening 46 to direct fluid from channel 44 of valve 10.

Figure 3:
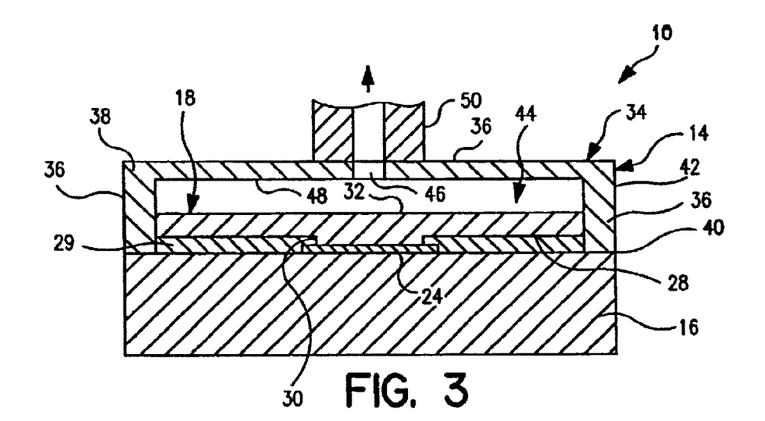
FIG. 3 is a cross-sectional end view of the microvalve device of FIG. 1 showing the valve in the open position.

In the embodiment of FIGS. 1–3, channel 44 of valve 10 is open at a first inlet end 52 and at a second outlet end 54 to provide a continuous fluid path extending through the valve 10. First open end 52 forms a fluid inlet that is connected to a fluid source by a pipe or other suitable conduit. Channel 44 extends completely through the valve 10 to second end 54 where the fluid can be directed to another location, such as a second outlet opening. Alternatively, second end 54 can be connected to a pipe or conduit to direct the fluid to a desired location.

Figure 1A:
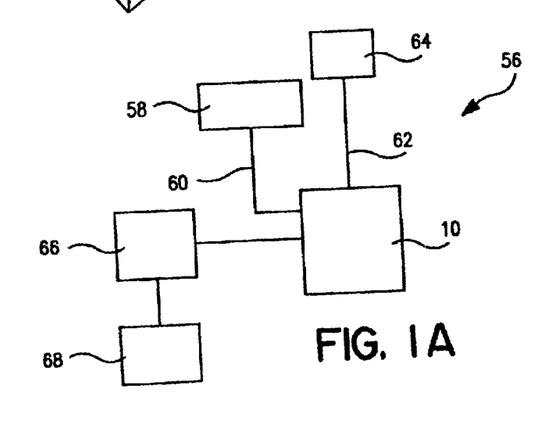
FIG. 1A is schematic view of a drug delivery device incorporating the device of the invention.

In one embodiment, microvalve 10 can be incorporated into a drug infusion device 56 as shown in FIG. 1A. Drug infusion device 56 includes a drug reservoir 58 connected to microvalve 10 by conduit 60. Conduit 60 is coupled to inlet end 52 by a suitable fluid coupling. Column 50 is connected to a conduit 62 for directing the fluid to a dispensing device 64. An electric power source 66 is connected to electrodes 24 and 26 for actuating valve 10. A controller 68 is connected to power source 66 to selectively supply current to electrodes 24 and 26. Power supply 66 is a DC power source that is able to supply a positive or negative current to electrode 24 as needed and for a predetermined period of time at selected intervals.

Permeation membrane 18 is a polymeric material that is preferably a water permeable membrane such as a hydrogel material. Suitable hydrogel materials include agarose and polyacrylamide polymers. It has been found that an electric charge applied to electrode 24 produces a distortion in permeation membrane 18. In a preferred embodiment, when a positive current is applied to electrode 24 and said electrode thus acts as an anode, an area 69 of permeation layer 18 that is in contact with electrode 24 contracts perpendicularly to electrode 24 while acquiring a positive charge. This membrane contraction is accompanied by a decrease in membrane thickness. When the current is subsequently interrupted, the presence of the charges in the permeation layer causes the membrane to expand in a direction perpendicular to the plane of permeation membrane 18.

The amount or extent of expansion of permeation membrane 18 is determined by the nature and composition of the polymer, by the intensity and polarity of the current applied to the permeation membrane 18, the length of time the current is applied, and the thickness of permeation membrane. It is believed that the electronic activation of the electrode produces charges or ions in the membrane, and that when the current is terminated, the charges act to generate a repulsive electrostatic force resulting in the vertical expansion. Typically, the membrane expands about 1–6 microns.

Although not completely understood, it is believed that the same mechanism can be applied to anion-mediated permlayer expansion due to the similar generation of anionic species upon application of a negative potential to electrode 24. In further embodiments, it is also believed that permeation layers containing charged species (such as zwitterionic, cationic or anionic comonomers) can be made to readily contract upon and during submission to a potential of opposite charge on electrode 24. Similarly, the permeation layers can be made to expand upon and during submission to a potential of the same charge.

Figure 4:
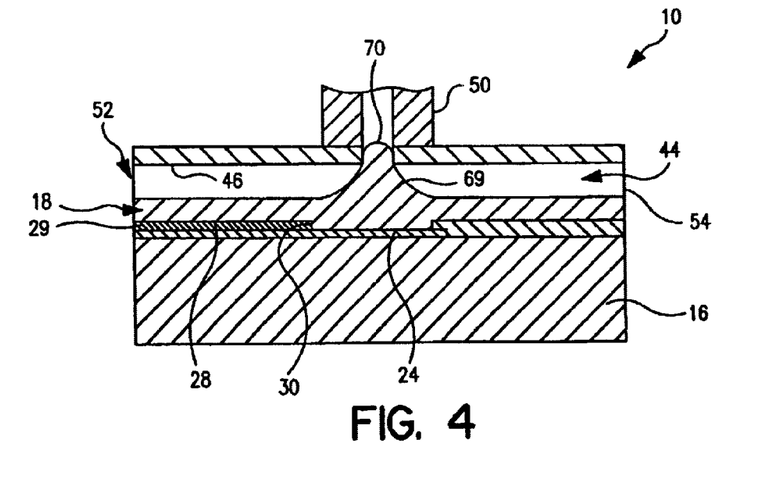
FIG. 4 is a cross-sectional side view of the microvalve structure of FIG. 1 showing the valve in the actuated and closed position.
Figure 5:
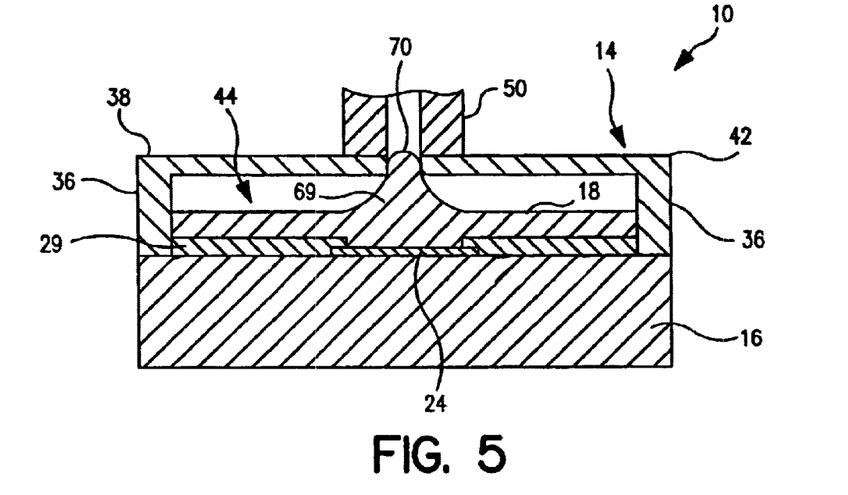
FIG. 5 is a cross-sectional end view of the valve device of FIG. 1 showing the valve in the actuated and closed position.

Referring to the drawings, permeation membrane 18 is normally in a relaxed state so that outlet opening 46 is open and fluid is able to pass through channel 44 and out through opening 46. A positive charge is applied to electrode 24 while a negative charge is applied to counter electrode 26 for a period of time of the order of a few milliseconds to several minutes. Upon termination of the electric address, permeation membrane 18 expands in area 69 and forms a protrusion 70 as shown in FIG. 4. Electrode 24 and opening 46 are oriented so that protrusion 70 expands to close opening 46 and prevent the flow of fluid. It has been found that a positive charge can be applied for short duration and interrupted to cause membrane 18 to expand and to effectively close opening 46. When the current is interrupted, it has been found that the deformation of permeable membrane remains for a period of time so that opening 46 remains closed during this period. The deformation of permeable membrane can remain for a period of several minutes to several hours depending on the composition of permeable membrane 18 and the current. In this manner, a current can be applied intermittently to maintain valve 10 in the closed position. Permeable membrane 18 will eventually return to its relaxed state after the current is interrupted.

Depending upon the permeation layer type and composition, such as the presence of cationic species covalently bound to or simply entrapped within the layer, it is believed that a negative charge applied to electrode 24 produces a contraction of the charged area to reduce the thickness of permeation membrane 18. In this manner, an intermittent positive charge can be applied to electrode 24 to deform permeation membrane 18 to close valve 10 and a negative charge can be applied to cause permeation membrane 18 to contract or relax to its original shape to open valve 10. In preferred embodiments, control device 68 is able to selectively actuate power supply 66 to apply a positive or negative charge to electrode 24 to open and close valve 10 as needed.

Valve 10 is preferably a microvalve having an outer dimension of about 1.5 cm by about 1.5 cm or less. The actual dimensions of valve 10 can vary depending on the intended use. In the embodiment of FIGS. 1–5, a single outlet opening is shown although any number of outlets and electrodes can be provided.

Actuator 12 and housing 14 are preferably made by microelectromechanical processes (MEMS) to produce the final shape and dimensions of valve 10. Valve 10 can be made of various materials such as silicon, glass, silicon dioxide, plastics or ceramic materials.

Actuator 12 has a structure substantially similar to the "biochips" manufactured by Nanogen, Inc. and disclosed in U.S. Pat. No. 6,051,380 which is hereby incorporated by reference in its entirety. In the embodiment illustrated, actuator 12 is an electrode pad having substantially square electrodes 24. Electrodes can be round or rectangular as desired. The size of electrodes can range from about 5 microns to about 500 microns. Typically, electrodes 24 range from about 10 microns to about 100 microns depending on the manufacturing techniques.

The electrodes can be made by microlithography and/or micromachining techniques as known in the art. Other techniques that can be used include electron beam lithography, ion beam lithography, and molecular beam epitaxy. Electrodes 24 are basically produced by applying a metal layer on base material by a suitable method. The actual method used will depend on the base material and the particular metal being applied. A photoresist layer is applied and the desired shape of the electrodes is produced by etching the excess metal. The remaining metal serves as the microelectrode site. Metals and other materials that are suitable for producing the microelectrodes include aluminum, copper, carbon, iron, silver, gold, palladium, platinum and indium tin oxide. Typically, an insulator material is applied to separate the microelectrodes from one another. Suitable insulator materials include, but are not limited to, silicon dioxide, silicon nitride, glass, resist materials, polyamide, rubber, plastics and ceramic materials.

A metal oxide layer can be applied to or formed on the microelectrode to provide a base for coupling of permeation layer 18. Metal oxides and hydroxyl groups, either alone or in combination, as well as other known materials can provide covalent bonding sites for applying the permeation layer to microelectrodes. In some applications, it is desirable to have permeation layer covalently bonded and attached to the surfaces of the microelectrodes. In other embodiments, the permeation layer can be applied by physical overlaying of the permeation layer. For example, microelectrodes made of platinum or gold can be overlaid with the permeation membrane.

In one embodiment of the invention, actuator 12 is made by standard mask design and standard microlithographic techniques. A base substrate is typically a 1 to 2 square centimeter silicon wafer having a thickness of about 0.5 millimeter. The silicon wafer is first overcoated with a 1 to 2 micron thick silicon dioxide insulation coating. The silicon dioxide can be applied by plasma-enhanced chemical vapor deposition (PECVD).

A metal layer, such as aluminum, is deposited by vacuum evaporation to form a layer of about 0.2 to 0.5 microns thick. The metal layer can also be applied by sputtering techniques. Various processes and materials can be applied to the base to enhance the bonding of the metal layer to the base.

A positive photoresist is then applied and masked with the desired electrode shape. The photoresist layer is exposed to light and developed. The photosolubilized resist is removed and the exposed metal layer is etched away to produce the desired pattern.

A layer of about 0.2 to 0.4 micron of silicon dioxide followed by 0.1 to 0.2 micron layer of silicon nitride ($Si_3N_4$) is applied to the base. The base is then covered with a positive photoresist, masked for the electrodes, exposed and developed. The photosolubilized resist is removed and the silicon dioxide and silicon nitride layers are etched away to expose the electrodes.

The permeation membrane is then applied to the exposed electrodes. The designs and techniques that can be used to apply the permeation membrane include lawns, meshes and porous structures. The permeation membrane can have a thickness layer of about 10 to 30 microns. In one embodiment, a modified hydrophilic gel is applied containing 20% to 35% polyacrylamide with 0.1% polylysine to fill the pores in the base. This material forms a coating in gel form with a pore limit of about 2 nm to about 10 nm. The permeation membrane allows the electrodes to function in the DC mode and allows small counterions to pass through the membrane.

Lawn-type permeation membranes involve the arrangement of linear molecules or polymers in a vertical direction from the surface. These structures are formed by attaching the hydrophilic polymer molecules to the metal surface with minimal cross-linking between the molecules.

Mesh-type permeation membranes are formed by random arrangements of polymeric molecules. The molecules form a mesh-like structure having an average pore size determined by the extent of cross-linking. These structures can be formed from hydrogel-type materials. Examples of suitable materials include polymers selected from the group consisting of agarose, glyoxylagarose, polyacrylamides, polymethacrylamides, polyacrylates, polymethacrylates, and copolymers thereof. Other biological and non-biological materials that can be polymerized and cross-linked can be used. Generally, the polymers are produced from vinylic monomers. These materials can be spin coated over the surface of the base. In further embodiments of the invention, permeation membranes can be made from polymers bearing an electric charge or from polymers that are capable of acquiring electric charges upon submission to an electric field.

Pore-type permeation membranes use materials that can form a channel or hole directly from the type surface of the membrane to the electrode pad. Examples of suitable materials include polycarbonates, polysulfone, and glass materials. This type of permeation membrane must be secured physically or chemically to the metal surface.

Housing 14 can be formed by similar micromachining or photolithography processes. Legs 36 of housing 14 can be formed by lithography or machining. Alternatively, legs 36 can be formed as separate members that are bonded to top wall 34 by suitable techniques. Legs 36 are bonded to base 16 using known bonding techniques commonly used in the micromechanical device industry.

Figure 6:
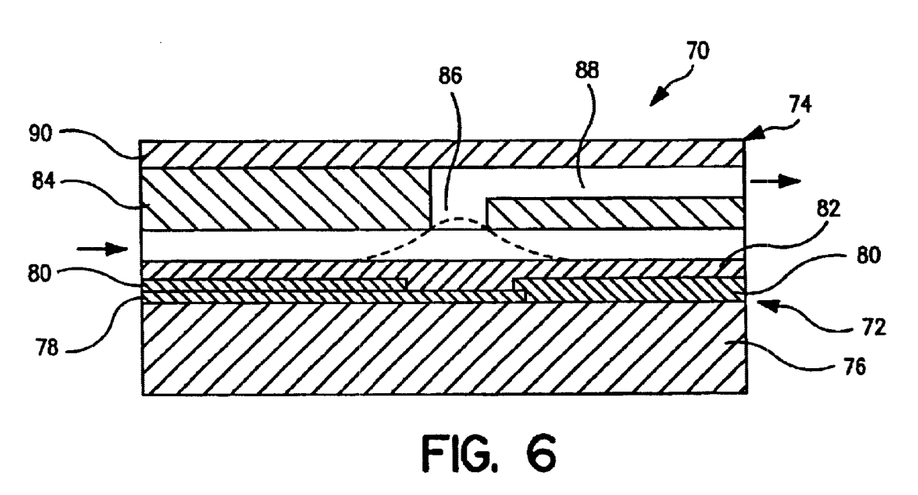
FIG. 6 is a cross-sectional side view of the microvalve structure in a second embodiment of the invention.

FIGS. 1–5 illustrate one embodiment of the invention for producing a microvalve where the permeation membrane deforms to contact and seal an outlet opening in the valve structure. In an alternative embodiment of the invention shown in FIG. 6, valve 70 includes an actuator 72 and a housing 74. Actuator 72 is substantially the same as the actuator of FIGS. 1–5 and includes a base 76, an electrode pad 78, an insulating layer 80 and a permeation membrane 82. Housing 74 is formed from a body portion 84 having a passage 86 extending therethrough. A channel 88 is formed in a top surface of body portion 84 communicating with passage 86 to define an outlet channel. A top wall 90 is attached to body portion 84 to enclose channel 88 and passage 86. Valve 70 is operated in a similar manner by applying an electric charge to electrode pad 78 for a predetermined period of time, which causes permeation membrane to expand and close passage 86 as indicated by phantom lines in FIG. 6. As in the previous embodiment, the current can be reversed to selectively open and close the valve 10.

Figure 7:
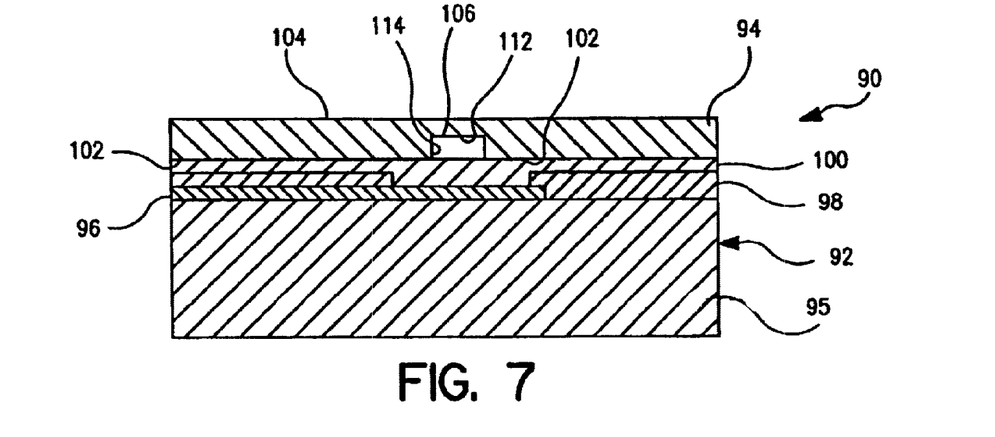
FIG. 7 is a cross-sectional end view of the microvalve structure in a third embodiment of the invention.
Figure 8:
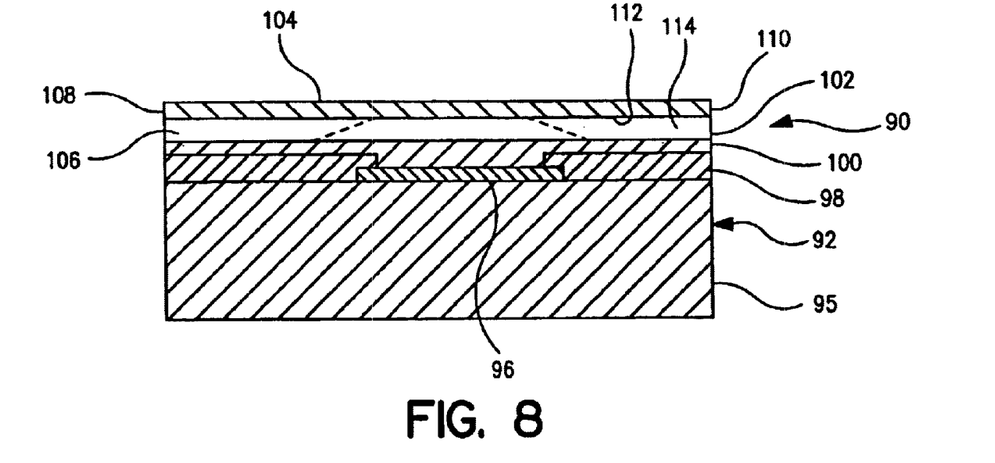
FIG. 8 is a cross-sectional side view of the microvalve of the embodiment of FIG. 7.

Embodiment of FIGS. 7 and 8

FIGS. 7 and 8 show a second embodiment of a valve 90 in accordance with the invention. Valve 90 is similar to the embodiment of FIGS. 1–5 and include an actuator 92 and a valve housing 94. Actuator 92 is similar to the previous embodiments and includes a base 95, an electrode pad 96 and an insulating layer 98 surrounding electrode pad 96. A permeation membrane 100 is applied over electrode pad 96 and insulating layer 98.

Housing 94 has a bottom face 102 and top face 104. Bottom face 102 includes a flow channel 106 extending from a first end 108 to a second end 110 of housing 94. As shown in FIG. 7, channel 106 extends directly over permeation membrane 100 and electrode 96. Channel 106 is shown as being formed with a substantially flat top surface 112 and straight side wall 114. In alternative embodiments, channel 106 can have inclined side walls to form a V-shaped channel or curved side walls to form a U-shaped channel. In preferred embodiments, channel 106 is formed by micromachining or photolithography processes. The process used to form channel 106 in the past determines the final shape of channel 106. For example, the etchant used to etch channel 106 determines whether straight or inclined side walls are formed.

In the embodiment of FIGS. 7 and 8, bottom face 102 housing 94 is coupled directly to actuator 92 so that there be no fluid flow between bottom face 102 and permeation membrane 100. In alternative embodiments, bottom face 102 can be spaced from permeation membrane 100 as in the previous embodiments.

Valve 90 is operated in a manner similar to the previous embodiments. An electric charge is applied to electrode pad 96 causing permeation membrane 100 to expand to the shape shown by phantom lines in FIG. 8 to fill a cross-sectional area of channel 106 to close the passage. As in the previous embodiments, reversing the current through electrode pad 96 causes permeation membrane 100 to return to its original shape and open channel 106.

Embodiment of FIGS. 9–12

Referring to FIGS. 9–12, another embodiment of invention is directed to a valve assembly 120 including an actuator 122 and a valve housing 124. Actuator 122 is substantially the same as in the previous embodiments and includes a base 126, an electrode pad 128, an insulating layer 130 and a permeation membrane 132.

Figure 11:
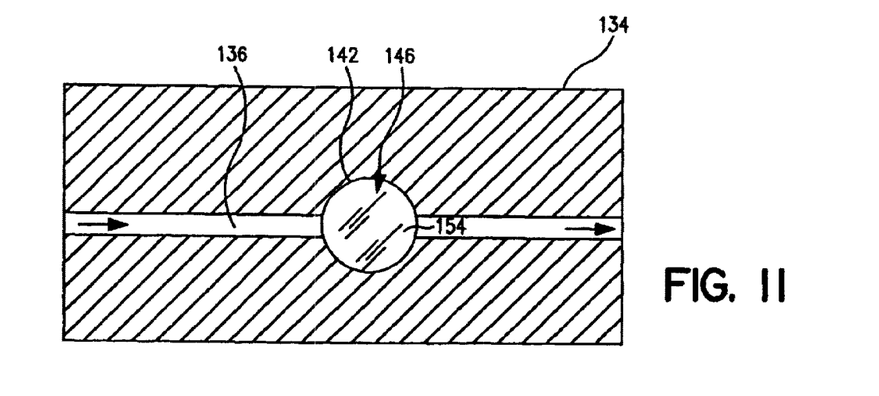
FIG. 11 is a cross-sectional top view of the microvalve structure taken along line 11—11 of FIG. 9.

Valve housing 124 includes a body 134 having a longitudinal flow channel 136 formed in a top face 138. Channel 136 in the illustrated embodiment has a substantially U-shape and extends from a first end 140 to a second end 141. An opening 142 extends through body 134 from top face 138 to a bottom face 144. Opening 142 is aligned with channel 136 as shown in FIG. 11 so that channel 136 extends through the center of opening 142. A valve membrane 146 is provided in opening 142 for reciprocating between an open position shown in FIG. 9 to a closed position shown in FIG. 12.

Figure 9:
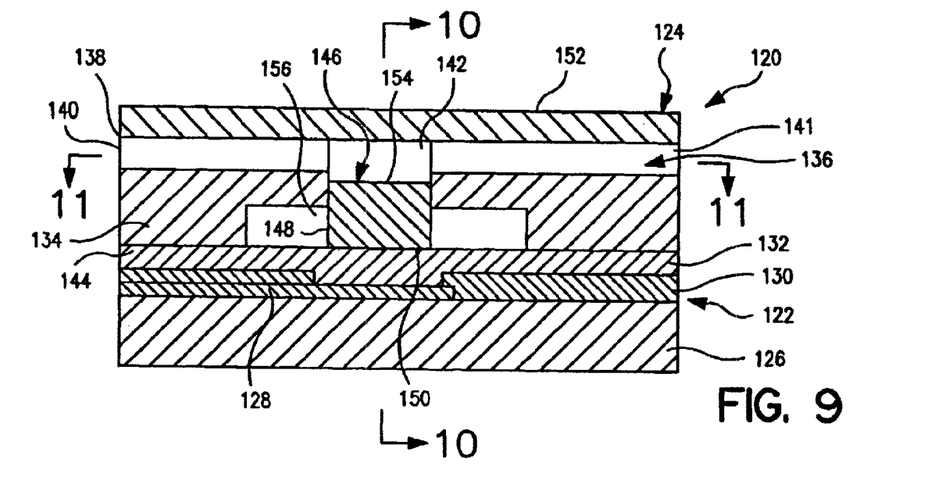
FIG. 9 is a cross-sectional side view of the microvalve structure in a fourth embodiment of the invention showing the electrode pad, movable valve and valve housing.
Figure 10:
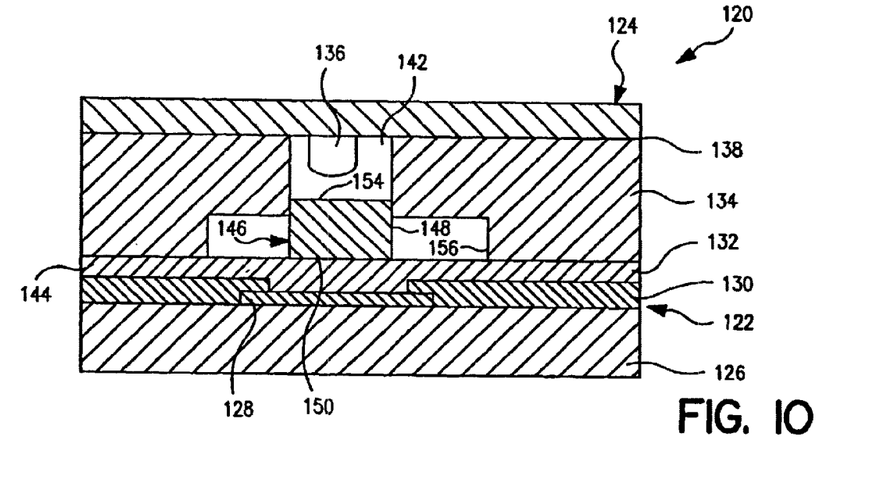
FIG. 10 is a cross-sectional view of the microvalve structure taken along line 10—10 of FIG. 9.

Referring to FIGS. 9 and 10, valve member 146 is a substantially cylindrical-shaped member having a side wall 148 complementing the shape and dimension of opening 142. A bottom end 150 of valve member 146 is substantially flat and is in contact with permeation membrane 132. A top wall 152 is coupled to valve body 134 to close the upper end of opening 142 and channel 136. A top end 154 of valve member 146 is substantially flat to mate with top wall 152 when valve member 146 is in a closed position.

Figure 12:
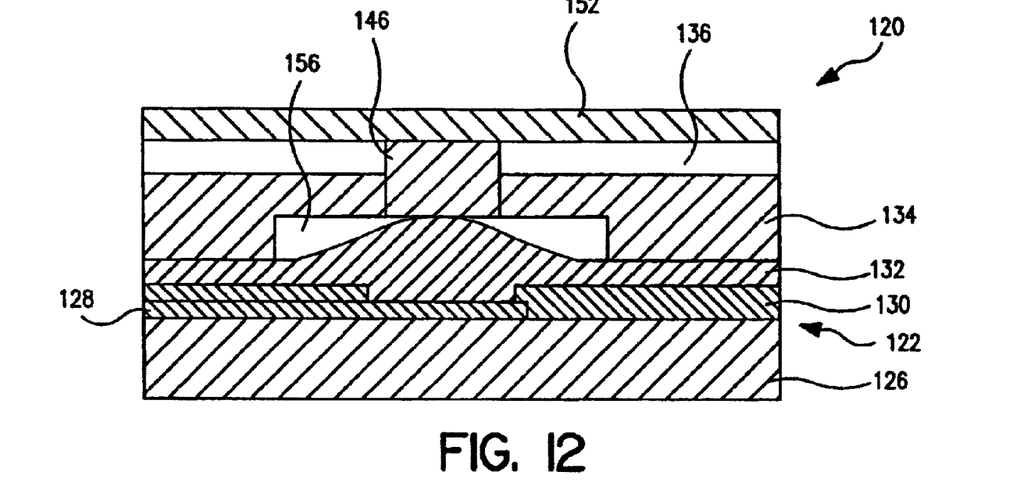
FIG. 12 is a cross-sectional side view of the microvalve structure of FIG. 9 in the closed position.

Valve assembly 120 is operated by applying an electric current to electrode pad 128 causing permeation membrane 132 to deform and expand as shown in FIG. 12. The expansion of permeation membrane 132 pushes valve member 146 toward top wall 152 to close channel 136. In the embodiment illustrated, a recess 156 is provided in bottom face 144 of valve body 134 to form a relief area for the expansion of permeation membrane 132. Valve member 146 can be attached to permeation membrane 132 to reciprocate within opening 142 with the expansion and contraction of permeation membrane 132. In further embodiments, valve member 146 can be biased to an open position toward permeation membrane 132.

Figure 13:
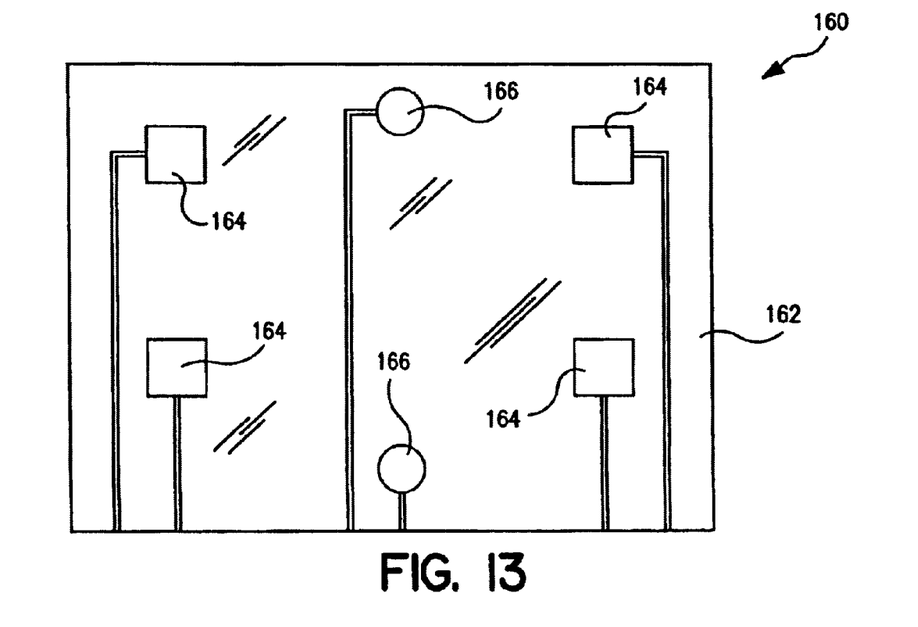
FIG. 13 is a top plan view of the electrode pad and membrane of the microvalve device in another embodiment of the invention.

Embodiment of FIG. 13

FIG. 13 shows another embodiment of an actuator 160 for use in a multivalve assembly. Actuator 160 as shown includes a base 162 and several electrode pad 164 spaced apart on base 162. In this illustrated embodiment, two counter electrodes 166 are provided. As in the previous embodiments, a deformable permeation membrane and valve housing (not shown) are provided. The resulting valve is operated in a manner similar to the previous embodiments.

While several embodiments have been chosen to illustrate the invention, it will be appreciated by those skilled in the art that various changes and modifications of the device can be made without departing from the scope of the invention as defined in the appended claims.

What is claimed is:

1. An actuator for a microelectromechanical device, comprising:
    an electrode pad;
    a permeation membrane on said electrode pad, said permeation membrane having a longitudinal dimension; and
    a member contacting said permeation membrane, where said permeation membrane is a hydrogel polymer and expands and contracts in a direction transverse to said longitudinal dimension when an electric current is applied to said electrode pad thereby moving said member.

2. The actuator of claim 1, wherein said electromechanical device is a microfluidic device.

3. The actuator of claim 1, wherein said electromechanical device is a valve having a fluid channel cooperating with said member, and wherein movement of said member closes said fluid channel.

4. The actuator of claim 3, wherein said member is a valve body, and wherein said valve body is coupled to said permeation membrane.

5. The actuator of claim 1, wherein said electrode pad comprises a substrate, an electrode coupled to said substrate, and an insulating layer overlying a portion of said substrate and said electrode and defining an exposed portion of said electrode, wherein said permeation membrane is in contact with said exposed portion of said electrode.

6. The actuator of claim 1, further comprising a DC electric power source coupled to said electrode pad for selectively applying a positive or negative charge to said electrode pad for a predetermined period of time and at predetermined intervals.

7. The actuator of claim 1, wherein said permeation membrane is a water permeable membrane.

8. The actuator of claim 1, wherein said permeation membrane has a thickness that increases as said permeation membrane expands and decreases as said permeation membrane contracts.

9. The actuator of claim 1, wherein said permeation membrane decreases in thickness when a positive current is applied to said electrode pad and wherein said permeation membrane increases in thickness when said positive current is interrupted.

10. The actuator of claim 1, further comprising a DC electric power source coupled to said electrode pad, said power source having a control to supply a positive or negative charge to said electrode pad for a predetermined period of time and to supply said positive or negative charge intermittently to said electrode pad to maintain a state of deformation of said permeation membrane.

11. A microvalve comprising:
a base substrate having at least one electrode pad;
a polymeric hydrogel permeation membrane on said electrode pad, said permeation membrane having a longitudinal dimension and being deformable in a direction transverse to said longitudinal dimension when an electric current is supplied to said electrode pad; and
a wall spaced from said permeation membrane to define a fluid path between said wall and said membrane, said permeation membrane being deformable when an electric current is applied to said electrode pad to substantially close said fluid path.

12. The microvalve of claim 11, wherein said permeation membrane has a thickness of about 10 to 30 microns.

13. The microvalve of claim 11, wherein said permeation membrane is a polymer selected from the group consisting of agarose, glyoxylagarose, polyacrylamides, polymethacrylamides, polyacrylates, polymer methacrylates, and copolymers thereof.

14. The microvalve of claim 11, wherein said permeation membrane is a polymer produced from vinylic monomers.

15. The microvalve of claim 11, wherein said permeation membrane is a polymer bearing electric charges or a polymer capable of acquiring electric charges upon submission to an electric field.

16. The microvalve of claim 11, wherein said wall includes at least one aperture defining a fluid outlet from said fluid path between said wall and said permeation membrane.

17. The microvalve of claim 16, said at least one aperture is disposed on said wall opposite said electrode pad, and wherein supplying said electric current to said electrode pad causes said permeation membrane to deform in an area of said electrode pad and close said at least one aperture.

18. The microvalve of claim 11, wherein said wall includes an outer face and an inner face, said inner face opposing said permeation membrane and having said fluid channel formed in said inner face.

19. The microvalve of claim 11, wherein said wall includes a recess extending from a fluid inlet to a fluid outlet of said microvalve to define said fluid path.

20. The microvalve of claim 19, wherein said recess is disposed opposite said electrode pad, and wherein said permeation membrane is deformable when an electric current is applied to said electrode pad to substantially close said recess.

21. The microvalve of claim 11, comprising a valve housing and a valve body mounted in said valve body for moving between an open position and a closed position, wherein said valve body is coupled to said permeation membrane.

22. The microvalve of claim 11, wherein said permeation membrane decreases in thickness when a positive current is applied to said electrode and increases when said positive current is interrupted.

23. The microvalve of claim 11, wherein said permeation membrane has a thickness that increases as said permeation membrane expands and decreases as said permeation membrane contracts.

24. A method of actuating a valve assembly of a microfluidic device, said method comprising the steps of
providing a microfluidic valve assembly having a base substrate with at least one electrode pad, a deformable polymeric hydrogel permeation membrane on said electrode pad, and a wall spaced from said permeation membrane to define a fluid path between said permeation membrane and said wall, and
supplying an electric current to said electrode pad for sufficient time to expand said permeation membrane in a direction toward said wall and to close said fluid path.

25. The method of claim 24, wherein said assembly further comprises a control for selectively controlling electric current to said electrode pad to open and close said fluid path.

26. The method of claim 24, comprising the step of selectively applying a positive charge to said electrode pad to selectively open said valve assembly or applying a negative charge to said electrode pad to selectively close said valve assembly.

27. The method of claim 24, wherein said valve assembly further comprises a valve member operatively connected to said permeation membrane.

28. The method of claim 24, wherein said valve assembly comprises a member operatively coupled to said permeation membrane, and said wall includes a fluid outlet, said method comprising supplying said electric current to said electrode pad to move said valve member into contact with said wall to close said fluid outlet.

29. The method of claim 24, wherein said permeation membrane is a polymer selected from the group consisting of agarose, glyoxylagarose, polyacrylamides, polymethacrylamides, polyacrylates, and polymethacrylates, and copolymers thereof.

30. The method of claim 24, wherein said permeation membrane is a polymer produced from vinylic monomers.

31. The method of claim 24, wherein said permeation membrane is a polymer bearing electric charges or a polymer capable of acquiring electric charges upon submission to an electric field.

32. The method of claim 24, wherein said wall includes at least one aperture defining a fluid outlet and said method comprises applying a current to said electrode pad to deform said permeation membrane to close said at least one aperture.

33. The method of claim 24, wherein said wall includes an outer face and an inner face, said inner face having at least one recess defining a fluid channel, said method comprising applying a current to said electrode pad to deform said permeation membrane to close said recess.

34. The method claim 24, wherein said valve assembly comprises a plurality of said electrode pads, and said wall comprise a plurality of fluid channels, wherein said method comprising selectively actuating said electrode pads to deform said permeation membrane to close a respective fluid channel.

35. The method of claim 24, wherein said permeation membrane has a thickness that increases when said permeation membrane expands.

36. The method of claim 24, wherein said permeation membrane decreases in thickness when a positive current is supplied to said electrode and decreases when said positive current is interrupted.

37. A microvalve comprising:

a base substrate having at least one electrode pad;

a polymeric permeation membrane on said electrode pad, said permeation membrane having a longitudinal dimension and being deformable in a direction transverse to said longitudinal dimension when an electric current is supplied to said electrode pad;

a DC electric power source coupled to said electrode pad, said power source including a control to selectively apply a positive or negative charge to said electrode pad for a predetermined period of time; and a wall spaced from said permeation membrane to define a fluid path between said wall and said membrane, said permeation membrane being deformable when an electric current is applied to said electrode pad to substantially close said fluid path, wherein said control of said power source applies said charge intermittently to said electrode pad to maintain a state of deformation of said permeation membrane.

38. A method of actuating a valve assembly of a microfluidic device, said method comprising the steps of providing a microfluidic valve assembly having a base substrate with at least one electrode pad, a deformable permeation membrane on said electrode pad, and a top wall spaced from said permeation membrane to define a fluid path between said permeation membrane and said top wall, wherein said permeation membrane remains deformed for a period of time after interrupting said electric current, and applying an electric current to said electrode pad at predetermined intervals and for sufficient time to expand said permeation membrane and to maintain said permeation membrane in a deformed condition to close said fluid path.

* * * * *